United States Patent [19]

Sirinyan et al.

[11] Patent Number: 5,274,039

[45] Date of Patent: Dec. 28, 1993

[54] COATING COMPOSITIONS CONTAINING CHEMICALLY MODIFIED AMORPHOUS POLYOLEFINS, A PROCESS FOR COATING PLASTICS WITH THESE COMPOSITIONS AND THE COATED PLASTICS PRODUCED THEREFROM

[75] Inventors: Kirkor Sirinyan, Bergisch Gladbach; Reinhold Dederichs, Leverkusen, both of Fed. Rep. of Germany; John L. Williams, Pittsburgh, Pa.

[73] Assignees: Bayer Aktiengesellschaft, Leverkusen, Fed. Rep. of Germany; Miles Inc., Pittsburgh, Pa.

[21] Appl. No.: 918,999

[22] Filed: Jul. 23, 1992

Related U.S. Application Data

[63] Continuation of Ser. No. 723,140, Jun. 28, 1991, abandoned, which is a continuation of Ser. No. 495,233, Mar. 16, 1990, abandoned.

[30] Foreign Application Priority Data

Mar. 21, 1989 [DE] Fed. Rep. of Germany ....... 3909217

[51] Int. Cl.$^5$ .................... C08L 23/28; C08L 23/32; C08L 23/36; C08L 75/04
[52] U.S. Cl. .................................... 525/130; 525/131; 525/285; 525/356
[58] Field of Search ................ 525/130, 131, 285, 356

[56] References Cited

U.S. PATENT DOCUMENTS

| | | | |
|---|---|---|---|
| 2,468,480 | 4/1949 | Bradley | 260/3.5 |
| 3,579,485 | 5/1971 | Folzenlogen | 525/285 |
| 3,634,546 | 1/1972 | Hagemeyer et al. | 525/268 |
| 3,676,391 | 7/1972 | De Ross | 260/33.6 |
| 4,692,357 | 9/1987 | Mayumi et al. | 427/393.5 |
| 4,769,406 | 9/1988 | Keithley | 525/193 |
| 4,778,724 | 10/1988 | Bragole | 428/414 |

FOREIGN PATENT DOCUMENTS

| | | | |
|---|---|---|---|
| 0203552 | 10/1983 | Fed. Rep. of Germany | 525/285 |
| 1-180280 | 7/1989 | Japan | |
| 1040539 | 8/1966 | United Kingdom | |

OTHER PUBLICATIONS

Theodore O. J. Kresser, Polypropylene, Reinhold Publishing Corp., pp. 65-70 (1960).
Mark L. Dannis, Thermal Expansion Measurements and Transition Temperatures, First and Second Order, Journal of Applied Science, vol. 1, Issue No. 1, pp. 121-126 (1959).
Julius Grant, Hackh's Chemical Dictionary, Fourth Edition, McGraw-Hill Book Company, Fourth Edition, p. 40.
Chemical Abstracts, vol. 112, No. 8, 1990, Ref. No. 58386c.
Chemical Abstracts, vol. 115, No. 24, 1986, Ref. No. 209609m.
Chemical Abstracts, vol. 105, No. 16, 1986 Ref. No. 135672c.
Chemical Abstracts, vol. 77, No. 12, 1972, Ref. No. 76253v.

*Primary Examiner*—James J. Seidleck
*Assistant Examiner*—Thomas Hamilton, III
*Attorney, Agent, or Firm*—Joseph C. Gil; Thomas W. Roy

[57] ABSTRACT

The present invention relates to a coating composition which contains a one- or two-component binder and, in addition, an adhesion promoter which is based on a chemically modified, amorphous polyolefin having an average molecular weight $M_w$ (weight average) in the range from 10,000 to 100,000 g/mol, a non-uniformity $U_n$ of 1.0 to 6.5, a chlorine content of about 2.5 to 50% by weight and a total content of nitrogen, oxygen, sulfur and silicon, in the form of chemically incorporated functional groups, of about 2.5 to 15.0% by weight.

The present invention also relates to a process for coating plastic substrates with this coating composition and to the coated plastic substrates obtained in accordance with this process.

4 Claims, No Drawings

COATING COMPOSITIONS CONTAINING CHEMICALLY MODIFIED AMORPHOUS POLYOLEFINS, A PROCESS FOR COATING PLASTICS WITH THESE COMPOSITIONS AND THE COATED PLASTICS PRODUCED THEREFROM

This application is a continuation of application Ser. No. 07/723,140 filed Jun. 28, 1991 which is a continuation of application Ser. No. 07/495,233 filed Mar. 16, 1990.

BACKGROUND OF THE INVENTION

1. Field of the Invention

The present invention relates to new coating compositions containing chemically modified, amorphous polyolefins, particularly polypropylenes; a process for coating plastic substrates with these coating compositions; and to the coated plastics thus obtained.

2. Description of the Prior Art

To apply firmly adhering paint coatings to plastics, particularly to polypropylene (PP) injection-molded parts, the substrate surfaces have to be chemically or physically modified. Reference is made in this regard to flame treatment (cf. for example F. Garbassi et al, J. Mater. Sci., 22, pages 207 to 212 (1987)), corona treatment (cf. for example F. Lawson, Rubber Chem. and Technol., 60, 102 (1987)), plasma treatment (cf. for example L. H. Coopes et al, J. Macromol. Chem., 17, pages 217 to 226 (1982) and EP-A-0 282 094) and pickling with chromosulfuric acid (cf. for example M. Salkauskas, J. Appl. Polym. Sci., 26, pages 2097 to 2098 (1981)). It is also known from the literature that plastic parts based on polypropylene and polyethylene can be painted with firmly adhering coatings by the use of primers based on clorinated polyolefins U.S. Pat. No. 3,676,391) or polyolefins which are modified with maleic acid anhydride (DE-OS 1,546,982).

These methods are expensive and, in addition, cannot be applied to injection-molded parts of complicated geometry. Apart from the high handling costs attributable to their low solids content, application of the primer coatings mentioned above additionally involves environmental problems. In addition, their use is limited to certain paint systems.

According to published PCT application WO 88/05346, the primer coatings are modified by additional measures, such as UV irradiation, which involves additional expense.

The addition of standard chlorinated polypropylenes, to plastics paints, as recommended in U.S. Pat. No. 2,468,480, is attended by the disadvantage that chlorinated polyolefins of this type are not compatible with conventional plastics paints. In addition, their solubility in typical paint solvents is very poor, which adversely affects their processibility.

Accordingly, the problem addressed by the present invention is to provide a new process for painting plastics which, through the use of new adhesions promoters, is suitable for the production of high-quality coating compositions without being attended by any of the disadvantages of the prior art processes mentioned above.

It was possible to solve this problem in accordance with the present invention by the use of certain adhesion promoters as described in detail hereinafter.

SUMMARY OF THE INVENTION

The present invention relates to a coating composition which contains a one- or two-component binder and, in addition an adhesion promoter which is based on a chemically modified, amorphous polyolefin having an average molecular weight $M_w$ (weight average) in the range from 10,000 to 100,000 g/mol, a non-uniformity $U_n$ of 1.0 to 6.5, a chlorine content of about 2.5 to 50% by weight and a total content of nitrogen, oxygen, sulfur and silicon, in the form of chemically incorporated functional groups, of about 2.5 to 15.0% by weight.

The present invention also relates to a process for coating plastic substrates with this coating composition and to the coated plastic substrates obtained in accordance with this process.

DETAILED DESCRIPTION OF THE INVENTION

The adhesion promoters crucial to the invention are chemically modified, chlorine-containing amorphous polyolefins, preferably chemically modified, amorphous polypropylenes, having an average molecular weight ($M_w$) determined by gel permeation chromatography of about 10,000 to 100,000, preferably about 15,000 to 60,000 and more preferably about 17,000 to 40,000 g/mol; a non-uniformity of 1.0 to 6.5, preferably from 1.5 to 4.5; a content of chemically bound chlorine of about 2.5 to 50% by weight, preferably about 15 to 40% by weight and more preferably about 20 to 35% by weight; and a total content of nitrogen, oxygen, sulfur and silicon, in the form of functional groups containing these elements, of about 2.5 to 15% by weight, preferably about 2.5 to 7.5% by weight. These functional groups in particular are responsible for the excellent compatibility of the additives according to the invention with standard paint systems and for their ready solubility in standard paint solvents. In addition, these functional groups provide for good physical fixing of the additive in the paint matrix.

Suitable functional groups include carboxyl, carboxylic anhydride, carboxylic acid ester, carboxylic acid amide, amino, carboxylic acid imide, aldehyde, ketone, sulfonic acid ester, hydroxyl, hydroperoxide and alkoxysilane groups; heterocyclic groups such as imidazole, carbazole or pyridinyl groups; activated double bonds such as vinylsulfonyl or vinylamino groups; and lastly mercapto groups. Particularly suitable functional groups are hydroxyl, hydroperoxide (H—O—O—) carboxyl, carboxylic anhydride, carboxylic acid amide, carboxylic acid imide, carboxylic acid ester, amino and alkoxysilane groups, preferably trimethoxysilane groups.

The above-mentioned functional groups which are suitable should not enter into any reactions either among themselves or with the paint components with which they are blended under typical storage conditions, i.e. in the presence of atmospheric moisture, oxygen and elevated temperatures of up to 120° C.

Preferred starting materials for the production of the chemically modified adhesion promoters are amorphous polypropylenes or polyethylenes having a molecular weight in the range from 10,000 to 120,000 g/mol and a non-uniformity of 1.0 to 7.5. However, it is also possible to use as "polyolefins" the corresponding amorphous copolymers of propylene with other olefinically unsaturated monomers, such as ethylene, isoprene, 1,2-butadiene and/or 1,4-butadiene, in positive amounts of up to 25% by weight, based on the weight of all the monomers.

Chlorine is introduced in known manner by chlorination of the amorphous polyolefins used as starting material (cf. Houben-Weyl, Methoden der Organischen Chemie, Vol. V/3, pages 511–551, Georg Thieme Verlag, Stuttgart (1962)). For the production of the additives according to the invention, the chlorination is carried out at temperatures of about −10° C. to the boiling point of the particular solvent used.

The functional groups may be incorporated by reaction with typical peroxides (incorporation of hydroperoxide or carboxyl groups) or by a radically initiated grafting reactions with monomers containing functional groups according to the invention. Suitable initiators for this grafting reaction are any of the peroxides or azo compounds which are known for this purpose. The modification reactions are also known and are described, for example, in the following literature references: G. A. Russel, J. Am. Chem. Soc., 79, 3871 (1957); M. Iring et al, Polymer Degradation and Stability, 5, 467 (1983); N. G. Gaylord, Journal of Polymer Science, Polymer Letters Edition, Vol. 21, 23–30 (1983); A. Neyishi et al, J. of Appl. Poly. Sci. 22, 2953 (1978); and A. Hoff, J. of Appl. Poly. Sci., 29, 465 (1984).

Suitable initiators include potassium peroxodisulfate, azo-bis-isobutyronitrile, t-butyl perbenzoate, t-amyl perneodecanoate, p-benzodines, t-butyl perisononanoate, di-2-ethylhexyl peroxydicarbonate or di-n-butyl peroxydicarbonate.

Suitable monomers containing functional groups include allylamine; allyl alcohol; trimethoxy vinyl silane; triethoxy vinyl silane; ethyl allyl ether; cyclohex-1-ene-4-dicarboxylic anhydride; maleic anhydride; maleic acid dimethyl, diethyl, dipropyl and dibutyl ester and acid amides thereof (such as maleic acid dimethyl amide, etc.); n-alkyl maleic acid imides (such as n-propyl maleic acid imide or n-butyl maleic acid imide); fumaric acid; fumaric acid dimethyl, diethyl, dipropyl and dibutyl ester and acid imides or amides thereof; 3-trimethoxysilyl-1-chloropropane; N-[2-(trimethoxysilyl)-ethyl]-ethylene-diamine; 3-trimethoxysilyl-1-chloropropane; mercapto-ethyl, mercaptopropyl and mercaptobutyl trimethoxy and triethoxy silane; vinylene carbonate; vinyl sulfone; 3-trimethoxy-silyl propyl-1-imidazole; and carbazole. Suitable monomers include those which generally do not react with the polyolefins to form block copolymers.

Functional groups may be incorporated either 1) in the melt by extrusion or other standard injection-molding techniques at temperatures in the range from approximately 140° C. to 300° C., but preferably at temperatures above the melting range of the particular polyolefins used (cf. G. M. Gale, Applied Organometallic Chemistry, 2 pages 17–31 (1988)) or 2) in a suitable solvent (cf. DE-OS 1 546 982). For the incorporation of functional groups in solution, the grafting reaction is generally carried out at elevated temperatures of approximately 40° C. up to the boiling point of the particular solvent. Suitable solvents include xylene, carbon tetrachloride, toluene, chlorobenzene, tetralin, cresol and mixtures of these solvents.

The sequence of the reactions (chlorination and incorporation of the functional groups) is not critical.

The additives, which are critical to the invention, are preferably used in solvent-containing coating compositions in quantities of about 0.1 to 15% by weight, preferably about 1 to 10% by weight and more preferably about 2 to 5% by weight, based on the weight of the solvent-free binder.

Suitable coating compositions include those containing one- or two-component polyurethane systems, alkyd resins, melamine resins, saturated or unsaturated polyester resins, nitrocellulose, rubbers or polyamide resins as binders. These coating compositions are preferably solvent-based paints containing the known paint solvents such as butyl acetate, methyl ethyl ketone, methyl isobutyl ketone, methoxypropyl acetate, toluene, xylene and mixtures of these solvents. However, it is also possible to use low-solvent, solventless or aqueous coating compositions in which the primers crucial to the invention are present in the quantities mentioned above. Suitable coating compositions are described, for example, in H. Kittel, Lehrbuch der Lacke und Beschichtungen, Vol. IV, pages 76 to 306, Verlag W. A. Colomb (1986) or in the same textbook, 1976 Edition, Vol. IV, pages 328 to 358.

Preferred coating compositions are one-component and, in particular, two-component polyurethane systems.

Preferred one-component polyurethane coating compositions are those based on predominantly linear, fully reacted polyurethanes which are soluble in organic paint solvents of the type previously mentioned and which no longer contain reactive centers, i.e., which dry physically (cf. for example, Kunststoff-Handbuch, Vol. 7, "Polyurethane," edited by Gunter Oertel, Carl Hanser Verlag, Munchen/Wien (1983) page 551). Suitable physically drying lacquers of this type include those wherein the binders are based on a fully reacted linear polyurethane prepared from (i) a polyester diol, (ii) a chain-extending agent and (iii) a diisocyanate. Suitable polyester diols (i) for the production of such polyurethanes include adipic acid/alkanediol/polyester diols having molecular weights of about 600 to 3,000. The alkanediols include 1,4-butanediol, 1,6-hexanediol, neopentyl glycol or mixtures of such glycols. Suitable chain-extending agents (ii) include diols of the type used for the production of the polyester diols and also diamines, such as hexamethylenediamine or isophoronediamine. Suitable diisocyanates (iii) include 4,4'-diisocyanatodiphenyl methane or isophorone diisocyanate. The polyurethanes are produced in known manner by reacting the starting materials at an equivalent ratio of isocyanate groups to isocyanate-reactive groups of about 0.9:1 to 1.1:1.

The particularly preferred two-component polyurethane paints are those wherein the binder is a two-component polyurethane system of the type described, for example, on pages 541 to 544 of "Polyurethane," (cited in the preceding paragraph). The two-component binders of these lacquers are generally based on a polyisocyanate component and a polyol component; these components are present in quantities which correspond to an equivalent ratio of NCO:OH of about 0.5:1 to 2:1, preferably about 0.8:1 to 1.5:1. Suitable polyisocyanates include the known paint-quality polyisocyanates, for example, biuret-, isocyanurate- or urethane-modified derivatives of simple diisocyanates such as 2,4-diisocyanatotoluene or mixtures thereof with 2,6-diisocyanatotoluene and, in particular, 1,6-diisocyanatohexane. The derivatives mentioned generally contain about 10 to 25% by weight of isocyanate groups.

Preferred polyols are polyester polyols, polyether polyols and polyacrylate polyols. The polyester polyols have a molecular weight ($M_n$) of 500 to 5,000 and contain at least 2, preferably 2 to 6 hydroxyl groups per molecule. The polyether polyols have a molecular weight ($M_n$) of about 500 to 5,000 and contain from 2 to 3 hydroxyl groups per molecule. The acrylate polyols have a molecular weight ($M_n$) of about 500 to 5,000 and contain 1 to 12% by weight of hydroxyl groups.

To increase their compatibility with paint solvents, neutral, cationic or anionic surfactants may also be added to the primers according to the invention. The surfactants are used in quantities of about 0.1 to 2.5% by weight, preferably about 0.1 to 1.0% by weight, based on the total solids content of the coating compositions. Preferred surfactants are neutral oligomeric or polymeric compounds based on ethoxylated alkanols containing 5 to 18, preferably 5 to 15 carbon atoms in the alkyl radical of the alcohol and having a degree of ethoxylation of 1 to 40. Other suitable surfactants include ammonium salts of oleic acid such as the diethyl ammonium salt of maleic acid; alkali alkyl sulfonates particularly sodium alkyl sulfonates containing 5 to 18 carbon atoms in the alkyl radical; alkali, preferably sodium, salts of alkyl benzenesulfonic acids containing 5 to 18 carbon atoms in the alkyl radical; dibutyl naphthalenesulfonates; lauryl alcohol sulfate; and dioctyl glycerol ether sulfate.

The coating compositions used may also contain other auxiliaries and additives such as catalysts, pigments, the previously mentioned solvents, flow control agents, fillers, etc.

When they are used in two-component polyurethane coating compositions, the auxiliaries and additives, particularly the adhesion promoters according to the invention, are generally added to the polyol component.

The coating compositions containing the adhesion promoters according to the invention are eminently suitable for coating thermoplastics or thermosets of various types. They are particularly suitable for coating polyolefins having a surface tension of at least 35 mN/m which are often difficult to paint with firmly adhering coatings. These polyolefins include modified and unmodified, partly crystalline or amorphous polypropylenes and polyethylenes. Polypropylene moldings are particularly preferred substrates for the coating compositions according to the invention. Other examples of suitable substrates include polyvinylidene fluoride, polytetrafluoroethylene, ethylene-propylene-norbornadiene plastics, acrylonitrile-butadiene-styrene copolymers, polycarbonates, polyamide plastics, polyesters, polybutadienes, polysilicones and cellulose esters.

The coating compositions containing the adhesion promoters which are critical to the present invention, are generally applied in a dry film thickness of about 0.5 to 100 μm, preferably from 20 to 50 μm by any of the methods used for painting plastics. In the case of multicoat painting, the base coat naturally contains the additive crucial to the invention. While the use of the same or analogous additives in the other paint coats is optional, improved intermediate paint adhesion can be obtained in this way. In this case, the primers are added in the quantities indicated above, even to those paint coats which do not come into direct contact with the plastics material to be painted.

The plastics painted in accordance with the invention may be used for various everyday applications, including for example the interiors and exteriors of automobiles, electrical and electronic appliances and domestic appliances of various kinds.

The invention is further illustrated but is not intended to be limited by the following examples in which all parts and percentages are by weight unless otherwise specified.

EXAMPLES

Example 1

100 g amorphous polypropylene having an average molecular weight $M_w$ of 60,000 g/mol were dissolved in 2000 g carbon tetrachloride. 12 g trimethoxy vinyl silane and 1 g t-butyl perbenzoate were then added dropwise to the resulting solution under nitrogen over a period of 1 hour at 70° C. The solution was cooled to 10° C. and pure chlorine was introduced with continuous UV irradiation until the weight increased by 48 g. The modified polymer was then precipitated in 5,000 g ethanol, washed 5 times with pure ethanol and dried overnight. An additive having an average molecular weight of approximately 40,000 g/mol was obtained. It contained 5% by weight oxygen, 2.2% by weight silicon and 30% by weight chlorine. It was soluble in xylene, toluene, butyl acetate, etc. and was distinguished by its excellent compatibility with typical solvents for plastics paints.

A 100×100 mm, commercially available modified polypropylene sheet (Hostalen PPN 8018, Hoechst AG) was discharged and freed from dust particles by blowing with ionized air and then spray-coated with a two-component polyurethane coating composition.

Component I of the coating composition was based on a mixture of 100 parts by weight of a polyacrylate resin containing hydroxyl groups; hydroxyl group content 2.8% by weight (Desmophen A 365, a product of Bayer AG), 20 parts by weight of a 25% by weight solution of the above-mentioned additive in xylene, 49.3 parts by weight talcum, 3.2 parts by weight black pigment (carbon black), 65.6 parts by weight titanium dioxide pigment (rutile), 4.8 parts by weight of a 10% solution in xylene of a commercially available antisettling agent (Bentone, a product of Kronos Titan GmbH, D-5090 Leverkusen) and 155 parts by weight of a solvent mixture of butyl acetate and xylene in a ratio by weight of 1:1.

Component II of the coating composition was based on a 75% solution in 1-methoxypropyl-2-acetate/xylene (1:1) of a biuret polyisocyanate based on 1,6-diisocyanatohexane; NCO content of the solution 16.5% by weight (Desmodur N 75, a product of Bayer AG).

After application, the coating composition was aired for 10 minutes and dried at 70° C.

The coating obtained was characterized by a paint adhesion according to DIN 53 151 of Gt 0 (Gt crosshatch).

Comparison Example I

When Example I was repeated without the critical additive according to the present invention results, the resulting coating had an adhesion value according to DIN 53 151 of Gt 5. The coating was easy to remove from the substrate surface.

Example 2

A 100×100 mm, carbon black-filled and glass fiber-reinforced polypropylene sheet (Hoechst AG) was provided with a coating as in Example 1.

A coated sheet characterized by excellent adhesion of the coating was obtained. The coating had an adhesion value according to DIN 53 151 of Gt 0 and easily passed both the weathering text (DIN 50017-KK) and the alternating temperature test (ASTM D1211

Comparison Example 2

Example 2 was repeated without the critical additive according to the present invention. The coating had an adhesion value of Gt 5. The coating was easy to remove from the substrate surface.

Example 3

100 g amorphous polypropylene having an average molecular weight $M_w$ of 100,000 g/mol were dissolved in 2,000 g carbon tetrachloride. 5 g azo-bis-isobutyronitrile in 100 ml carbon tetrachloride were then added dropwise to the resulting solution over a period of 120 minutes, followed by stirring for 3 hours at 75° C. Chlorine gas was then introduced into the solution with UV irradiation over a period of 60 minutes at 0° C.; the weight of the polypropylene increased by 21.8 g. The carbon tetrachloride was then replaced by pure xylene. A clear polymer solution was obtained. The solution had a solids content of 25% by weight. The modified polypropylene had an oxygen content of 3.5% by weight in the form of hydroxyl, hydroperoxy, carboxyl and chlorocarbonyl groups and, in addition, contained 17.5% by weight chemically-bound chlorine.

A 100×100 cm polypropylene sheet was pressure-coated with a two-component polyurethane coating composition in a dry film thickness of about 15 μm.

Component I of the coating composition was based on a mixture of 100 parts by weight of a polyester polyol having a hydroxyl group content of 2.7% (Desmophen A 565, a product of Bayer AG),
10 parts by weight of the above-mentioned solution of the additive to the invention,
50 parts by weight talcum,
3.7 parts by weight black pigment,
65.6 parts by weight titanium dioxide pigment (rutile) and
4.8 parts by weight of the solution of the anti-settling agent described in Example 1.

Component II of the coating composition was based on 40 parts by weight of the solution of a biuret polyisocyanate described in Example 1.

After airing and drying as described in Example 1, a coating having a paint adhesion of Gt 0 was obtained.

Further investigations demonstrated that the additive used does not adversely affect the properties of paint component I even after storage for several months. The pot life of the coating composition also remained unchanged.

Comparison Example 3

When Example 3 was repeated without the critical additive according to the present invention, a paint adhesion of Gt 5 was obtained.

Example 4

100 g amorphous polypropylene having an average molecular weight of 40,000 g/mol was modified with N-[2-(trimethoxysilyl)-ethyl]-ethylenediamine in accordance with G. M. Gale, Applied Organometallic Chemistry, 2, 17 (1988). 3 g di-2-ethylhexyl peroxydicarbonate in 50 g carbon tetrachloride was then added under nitrogen to the modified polypropylene at a temperature of 70° C., followed by chlorination at 0° C. under UV irradiation. The modified polymer was precipitated in ethanol and dried under vacuum overnight at 80° C. The additive obtained had an average molecular weight of 22,000 g/mol and a nitrogen content of 1.4% by weight, an oxygen content of 4.5% by weight, a silicon content of 1.4% by weight and a chlorine content of 24.8% by weight. It was soluble both in polar solvents, such as butyl acetate, and apolar solvents and was distinguished by high compatibility and miscibility with known coating compositions.

A two-component polyurethane coating composition was prepared as in Example 1 with the exception that 3.5% by weight of the additive described above was used instead of the additive used in Example 1. A coating was prepared in accordance with the process described in Example 1 (coating of a polypropylene sheet). The coating had a paint adhesion of Gt 0.

Example 5

50 g amorphous polypropylene having an average molecular weight of 30,000 g/mol were dissolved in 1000 g toluene. 7.5 g allylamine in 75 g toluene and 1.0 g t-amyl perneodecanoate in 50 g toluene were then added dropwise under nitrogen to the resulting solution over a period of 2 hours at 80° C. The solvent was then removed from the polymer under vacuum. The polymer was dissolved in 250 g carbon tetrachloride and chlorinated at 0° C. by UV irradiation.

A modified polymer containing 3% by weight nitrogen, 2% by weight oxygen and 18% by weight chlorine was obtained. The modified polymer was readily soluble in coating compositions and solvents therefor.

A two-component polyurethane coating composition was prepared as in Example 1 with the exception that 2% by weight of the additive described above was used instead of the additive used in Example 1. A coating was prepared in accordance with the process described in Example 1 (coating of a polypropylene sheet). The coating had a paint adhesion of Gt 0.

Example 6

Amorphous polypropylene (250 g) having an average molecular weight of 90,000 g/mol was modified with maleic acid anhydride in accordance with the N. G. Gaylord, J.Polym.Sci.,Polym.Leet.Ed.,21, pages 23–30 (1983), dissolved in 5000 g carbon tetrachloride, chlorinated under nitrogen with UV irradiation and then precipitated in ethanol. A polypropylene containing

and —CH$_2$—O—OH— groups with an oxygen content of 5.8% by weight, a chlorine content of 10% by weight and average molecular weight of 40,000 g/mol was obtained.

A two-component polyurethane coating composition was prepared as in Example 1 with the exception that a 25% by solution of the additive described above was used instead of the additive used in Example 1. A coating was prepared in accordance with the process described in Example 1 (coating of a polypropylene sheet). The coating had a paint adhesion of Gt 0.

EXAMPLE 7

A polypropylene sheet was coated in accordance with the process of Example 1 with an elastic two-component polyurethane coating composition in a dry film thickness of about 20 μm.

Component I of the elastic paint was based on a mixture of
- 15.1 parts by weight of a polyester resin containing hydroxyl groups; hydroxyl group content 4.3% by weight (Desmophen 670, a product of Bayer AG),
- 18.5 parts by weight of a polyacrylate resin containing hydroxyl groups; hydroxyl group content 2.8% by weight (Desmophen A 365, a product of Bayer AG),
- 0.8 part by weight of a 10% solution of 1,4-diazabicyclo-(2,2,2)-octane in butyl acetate,
- 3.8 parts by weight UV stabilizer (Tinuvin 292, a product of Ciba-Geigy AG), 10% solution in xylene,
- 22.8 parts by weight $TiO_2$ (Bayertitan R-KB 4, a product of Bayer AG),
- 3.8 parts by weight of a 10% solution in xylene of a commercially available anti-settling agent (Bentone, a product of Kronos Titan GmbH) and
- 16.6 parts by weight of a 30% by weight solution in xylene of the additive mentioned in Example 1.

Component II of the coating composition was based on a 75% solution in 1-methoxypropyl-2-acetate/xylene (1:1) of a biuret polyisocyanate (Desmodur N 75, a product of Bayer AG, cf. Example 1).

After application, the coating composition was aired for 20 minutes and dried at 80° C.

An optically satisfactory transparent coating having a paint adhesion according to DIN 53 151 of Gt 0 was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition which comprises a one- or two-component polyurethane binder and, in addition, an adhesion promoter comprising a chemically modified, amorphous polyolefin having an average molecular weight ($M_w$) prior to chemical modification of about 30,000 to 100,000 g/mol, a non-uniformity $U_n$ of 1.0 to 6.5, a chlorine content of 2.5 to 50% by weight and a total content of nitrogen, oxygen, sulfur and silicon, in the form of chemically incorporated functional groups, of about 2.5 to 15.0% by weight, wherein said amorphous polyolefin is amorphous polypropylene or an amorphous copolymer of polypropylene with other olefinically unsaturated monomers in a positive amount of up to 25% by weight, based on the total weight of all the monomers.

2. The coating composition of claim 1 wherein said chemically modified, amorphous polyolefin comprises chemically modified, amorphous polypropylene.

3. The coating composition of claim 1 wherein said binder comprises a two-component polyurethane.

4. The coating composition of claim 2 wherein said binder comprises a two-component polyurethane.

* * * * *